United States Patent [19]
Kerridge et al.

[11] 3,965,059
[45] June 22, 1976

[54] ALKYD RESIN

[75] Inventors: John Charles Kerridge; John William Syson, both of Billingham, England

[73] Assignee: Imperial Chemical Industries Limited, London, England

[22] Filed: Nov. 29, 1974

[21] Appl. No.: 528,545

[30] Foreign Application Priority Data
Dec. 10, 1973 United Kingdom............... 57124/73

[52] U.S. Cl............................. 260/22 CB; 260/873
[51] Int. Cl.$^2$.................. C08G 63/02; C08L 67/06; C09D 3/66
[58] Field of Search........................ 260/22 CB, 873

[56] References Cited
UNITED STATES PATENTS

| | | | |
|---|---|---|---|
| 2,404,836 | 7/1946 | Gerhart et al. .................. | 260/22 CB |
| 3,088,927 | 5/1963 | Dissen ............................ | 260/22 CB |
| 3,230,162 | 1/1966 | Gilchrist ........................ | 260/22 CB |
| 3,231,634 | 1/1966 | Wismer et al. ................... | 260/873 |
| 3,389,015 | 6/1968 | Scala et al. .................... | 260/22 CB |
| 3,594,341 | 7/1971 | Bata et al. ...................... | 260/28.5 A |
| 3,600,348 | 8/1971 | Humphrey ..................... | 260/28.5 A |
| 3,786,008 | 1/1974 | Piiroya et al. .................. | 260/22 CB |
| 3,843,752 | 10/1974 | Katayama et al. ................ | 260/873 |
| 3,870,667 | 3/1975 | Syson et al. .................... | 260/22 CB |
| 3,870,667 | 3/1975 | Syson et al. .................... | 260/22 CB |

FOREIGN PATENTS OR APPLICATIONS

| | | | |
|---|---|---|---|
| 46-14911 | 4/1971 | Japan............................. | 260/22 CB |
| 1,164,815 | 9/1969 | United Kingdom ........... | 260/22 CB |

OTHER PUBLICATIONS

Patton, Alkyd Resin Technology Formulating Techniques and Allied Calculations, Interscience Publishers, N.Y., N.Y., 1962, pp. 16–26.
Donnelly, Defensive Publication of Serial No. 494,020, filed Aug. 1, 1974.

*Primary Examiner*—Ronald W. Griffin
*Attorney, Agent, or Firm*—Cushman, Darby & Cushman

[57] ABSTRACT

At least a part of the polybasic acid component of an alkyd resin comprises the reaction product of an olefinically unsaturated hydrocarbon resin, e.g. derived from pyrolysis gasoline, with an alpha, beta-olefinically unsaturated monobasic acid, dibasic acid or a derivative thereof such as maleic anhydride.

9 Claims, No Drawings

ALKYD RESIN

The present invention relates to novel alkyd resins, to their preparation and to compositions containing them.

An alkyd resin may be generally considered as the polyester condensation product of a polyhydric alcohol and a polybasic acid, the polyester usually being chain-terminated by means of a monobasic acid. Compositions containing alkyd resins are widely used in the surface coating industry in which an alkyd resin containing olefinic unsaturation in solution in a solvent, suitably a hydrocarbon solvent, is blended in the cold with other resin or polymer solutions to give a clear finish or is used as the vehicle for pigment grinding to form ultimately a coloured surface coating which oxidises in the presence of air to a hard film.

The components of the alkyd resin obviously exert an effect on its properties. For example, if the monobasic acid is unsaturated a "drying alkyd" is obtained in which chemical reaction takes place in the surface coating after application. If the monobasic acid is substantially saturated then a "non-drying alkyd" is obtained. In a similar manner the structure of the polybasic acid also influences the properties of the alkyd resin and it is to this part of the alkyd molecule that the present invention is directed.

According to the invention, therefore, a novel alkyd resin comprises the condensation product of a polybasic acid and polyhydric alcohol in which part at least of the polybasic acid is the reaction product of an olefinically unsaturated hydrocarbon resin with an alpha-beta olefinically unsaturated monobasic acid, dibasic acid or derivative thereof.

Preferably the condensation product also comprises a monobasic acid.

The hydrocarbon resin is suitably derived from a petroleum feedstock and, in particular, from a pyrolysis gasoline. Pyrolysis gasoline is a fraction obtained when a hydrocarbon feedstock is cracked by heating, optionally in the presence of steam, and subsequently distilled. Naphtha (boiling range 32° to 205°C) is a suitable hydrocarbon feedstock, but other crude oil derivatives such as kerosine (boiling range 205° to 260°C) and a light or heavy gas oil (boiling ranges 205° to 315°C and 315° to 430°C respectively) may also be used.

Pyrolysis gasoline typically boils in the temperature range 0° to 200°C and comprises a number of saturated and unsaturated cyclic and acyclic aliphatic hydrocarbons containing 4 to 10 carbon atoms. Notable constituents of the pyrolysis gasoline include isoprene, piperylene, cyclopentadiene, pentanes, pentenes, hexanes, hexenes, cyclohexane and methylcyclohexane.

The unsaturated components of the pyrolysis gasoline are amenable to polymerization which may be catalysed by a Friedel Crafts catalyst such as aluminium chloride. The product of the polymerization process is an amorphous resin which usually has a softening point in the temperature range 70° to 110°C. This resin still contains residual olefinic unsaturation and can be further reacted with an alpha-beta olefinically unsaturated mono- or di-basic acid or derivative such as an ester or anhydride to provide a product which is still a resin and which now contains carboxyl or carboylic acid derivative groups, e.g. ester or anhydride groups which can undergo an ester forming reaction. The alkyd resin according to the invention is, therefore, a polyester in which in the ester linkages —O.OOC— the —O. is derived from the polyhydric alcohol and part at least of the .OOC— from the alpha-beta olefinically unsaturated mono- or di-basic acid linked to the hydrocarbon resin.

It is peferred that the pyrolysis gasoline should be free from aralkenes such as styrene so that the resin which is produced by the Friedel Crafts polymerization does not contain any aromatic groups. It is also advantageous to add to the pyrolysis gasoline a proportion of $C_4$ alkenes or di-isobutene so as to obtain a ratio of $C_4$ to $C_5$ hydrocarbons in the range 0.05 to 0.75, e.g. 0.05 to 0.25 to 1. The $C_4$ alkenes may be suitably added as the mixture obtained after butadiene has been removed from a cracker $C_4$ stream as is described in our co-pending UK patent application No. 45333/72 (equivalent Belgian patent No. 805,585). Another desirable pretreatment of the gasoline involves the dimerization of the cyclopentadiene to dicyclopentadiene by heating at a temperature in the range 80° to 140°C, preferably 110° to 130°C. The dicyclopentadiene may be separated from the remainder of the pyrolysis gasoline prior to the polymerization by distilling off the latter or it may be left to take part in the polymerization.

The polymerization is preferably catalysed by a Friedel Crafts catalyst such as an inorganic halide, preferably a halide of aluminium, iron, tin, boron, zinc, antimony or titanium which may be used in conjunction with a hydrogen halide such as hydrogen chloride. For example, treatment of the pyrolysis gasoline with aluminium chloride, preferably complexed with hydrogen chloride, in an aromatic solvent such as toluene or a xylene produces a solution from which a resin may be recovered. Preferably, however, the Friedel Crafts catalyst is used in an aromatic solvent which is a benzene which is liquid at the temperature of the polymerisation and which is substituted by at least one secondary or tertiary alkyl group or by a cycloalkyl group, e.g. tert.butyl benzene, p-cymene, p-isobutyl toluene, p-ethyl-tert.anyl benzene, or in particular, cumene. Such catalysts are described in our British Patent No. 1,360,390; (equivalent Belgian Patent No. 779,454) a complex of aluminium chloride, cumene and hydrogen chloride being preferred. The polymerization of the pyrolysis gasoline is preferably carried out at a temperature of −100° to +200°C, more preferably 50° to 100°C under atmospheric pressure or a positive pressure, e.g. up to 700 p.s.i.g., using a catalyst concentration (expressed as aluminium chloride) suitably 0.05 to 5%, preferably 0.5 to 1.5% by weight of the gasoline, the catalyst preferably being added in small amounts during the course of the reaction. The catalyst is finally broken down and removed from the polymer by treatment, for example, with alcoholic ammonia, aqueous alkali or aqueous alcohol followed by one or more washes with water and, optionally, a steam distillation to remove residual monomers. Suitable alcohols to use in the catalyst removal are alkanols containing 1 to 4 carbon atoms, e.g. isopropanol, and suitable alkalis are the alkali metal hydroxides such as sodium hydroxide.

The alpha-beta unsaturated acids or derivatives suitably contain up to 15 carbon atoms, e.g. acrylic acid, methacrylic acid, maleic acid, fumaric acid, itaconic acid, citraconic acid or mesaconic acid. Suitable derivatives of the acids include esters particularly lower alkyl ($C_1$ to $C_6$) esters such as methyl methacrylate and where appropriate, the dibasic acid anhydrides. Of these maleic acid or maleic anhydride is preferred and henceforth in this specification the reaction of the hydrocarbon resin with the unsaturated acid or derivative will be referred to as the "maleinization" reaction.

The "maleinization" reaction is preferably carried out under an inert atmosphere free from oxygen, e.g. under nitrogen. The resin from the Friedel Craft's polymerization may be melted and the acid or derivative, e.g. solid maleic acid or anhydride added preferably in small amounts over a period of time at a temperature where practicable in the range 150° to 300°C, preferably 200° to 250°C. The duration of the reaction is up to 10 hours, acid or acid derivative being suitably added over the first half of the time and the reaction mixture being held at the desired temperature for the second half of the time. Lighter coloured "maleinized" resins are obtained if the resin which is obtained at the end of the steam distillation after the Friedel Crafts reaction is not cooled down but is heated immediately under an inert atmosphere to the temperature at which the "maleinization" is to take place. Maleic anhydride is preferred for use in the "maleinization" reaction.

The polybasic acid component of the alkyd resin may be all derived from the hydrocarbon resin/unsaturated acid adduct or it may also include one or more other polybasic acids, particularly those commonly used in the preparation of conventional alkyd resins. Such acids include ortho-, iso and tere-phthalic acids, an aliphatic dibasic acid containing up to 20 carbon atoms, e.g. maleic acid, fumaric acid, azelaic acid, succinic acid, adipic acid or sebacic acid or a polybasic acid such as trimellitic or pyromellitic acid.

The polyhydric alcohol component of the alkyd resin may be any of those conventionally used in the industry. Outstanding examples are diols, e.g. containing up to 20 carbon atoms, such as mono-, di- tri-ethylene glycol, mono-, di- and tri-propylene glycol, mono-, di-, tributylene glycol and neopentyl glycol, and diols containing up to 20 and even more carbon atoms, e.g. polyethylene glycol, polypropylene glycol and polybutylene glycol; triols, e.g. containing up to 20 carbon atoms, such as glycerol, trimethylol propane and trimethylol ethane, and polyols, e.g. containing up to 20 carbon atoms such as pentaerythritol, dipentaerthritol and sorbitol.

The monobasic acid which may form a part of the alkyd resins according to the present invention may be derived from the free acid or from an ester such as a glyceride. The acid is suitably an aliphatic saturated or ethylenically unsaturated acid containing up to 30 carbon atoms, preferably 6 to 22 carbon atoms. Mixtures of acids or their esters may also be employed, particularly naturally occurring mixtures such as tall oil acids, linseed oil, soyabean oil, soya oil, whale oil, dehydrated castor oil, tung oil, fish oil, safflower oil, oiticica oil, cotton seed oil and coconut oil. Individual acids which are acceptable include iso-octanoic acid, 2-ethylhexanoic acid, iso-decanoic acid, lauric acid and pelargonic acid.

The olefinically unsaturated hydrocarbon resin which is used in the preparation of the alkyd resin according to the invention usually comprises a mixture of polymeric molecules of different molecular weights. It is preferred, however, that the hydrocarbon resin be reacted with the alpha- beta-unsaturated acid or derivative in such amount that 1 to 4 gram moles of acid react with 1 gram mole of hydrocarbon resin, the molecular weight of the latter being a mean value where appropriate.

The novel alkyd resins may be prepared by an esterification technique in which the resin/unsaturated acid or derivative adduct (including any additional polybasic acid), polyhydric alcohol and optional monobasic acid or glyceride are heated together at a temperature suitably in the range 100° to 400°C, preferably 120° to 270°C and the water or alcohol of reaction removed. If desired, the removal of water may be facilitated by use of a suitable entrainer such as toluene or xylene. The esterification may also be carried out in two stages, in the first of which the mono-basic acid or monobasic acid ester is reacted with the polyhydric alcohol and the intermediate product so formed is then further reacted with the resin/unsaturated acid or derivative adduct (including any additional polybasic acid). A suitable transesterification catalyst may be used in both methods of preparation, e.g. litharge or a titanium alkoxide. The ratio of reactants used to make the alkyd resin is preferably such as to provide a 5 to 30% excess of polyol over that required to esterify all the acids present.

Alkyd resins according to the present invention are compatible with aliphatic hydrocarbon solvents and when unsaturated are useful in formulating water and alkali resistant surface coatings of improved hardness and excellent weathering properties, and hard, rapid drying lithographic inks which are hydrophobic and soluble in aliphatic solvents. They may be used as surface coatings directly when they may be applied to the surface as solutions in suitable solvents, e.g. a hydrocarbon solvent such as white spirit, typical concentrations of resin in the solvent being 50 to 90% by weight.

The invention will now be further described with reference to the following Examples.

EXAMPLE 1

600 grams of linseed oil and 10.7 grams of ethylene glycol were placed in a 2 litre glass vessel provided with a stirrer, a nitrogen bleed, a thermocouple sleeve and a Dean and Stark head. The linseed oil and ethylene glycol mixture was heated up to 140°C over a period of 30 minutes when 0.13 gram of litharge was added and the temperature raised to 180°C where it was held for a further 2 hours.

At the end of this time the reaction mixture was cooled to 50°C and 30 mls. toluene and 400 grams of IMPREZ 125C added. (IMPREZ is a trademark and IMPREZ 125C is the product of reacting maleic anhydride with a petroleum resin obtained by the Friedel Crafts polymerisation of the $C_5$ fraction of a steam cracked naphtha. The mean molecular weight of the resin is about 1300 and it is reacted with 10 wt.% maleic anhydride). The mixture was next heated up to 260°C and held at this temperature for 6 hours, the water of reaction being removed as an azeotrope with the toluene. Finally the toluene itself was removed and the reaction mixture cooled to 150°C and sufficient white spirit added to produce a 70 wt.% solution. The final acid value of the product was determined as 8.1 mg. KOH/gram and the viscosity of the pure resin at 25°C was greater than 40 poise.

EXAMPLE 2

600 grams of soya bean oil were charged to the 2 litre vessel equipped as in Example 1 and the temperature raised to 250°C. A suspension of 0.2 gram litharge in 20.1 gram ethylene glycol was then added over a period of 30 minutes and the temperature maintained at 250°C for a further 30 minutes. After cooling to 225°C 400 grams of IMPREZ 125C were added together with 40 grams xylene entrainer and the reaction mixture held at 225°C for 6 hours. Following removal of the xylene by distillation the reaction mixture was cooled and the final acid value determined as 7.4 mg. KOH/gram while the viscosity at 25°C was greater than 40 poise.

EXAMPLE 3

200 grams of soya bean oil were placed in a 1 litre glass vessel equipped as in Example 1 and the temperature raised to 250°C. Over a period of 30 minutes a suspension of 0.2 gram litharge in 15 grams ethylene glycol was added and the heating then continued at 250°C for a further 30 minutes. After cooling to 225°C 300 grams IMPREZ 125C and 30 grams xylene were added and the temperature maintained at 225°C for a further 5 hours. After removal of the xylene and cooling down the final acid value was found to be 9.8 mg/KOH/gram and the viscosity at 25°C was greater than 40 poise.

EXAMPLE 4

EVALUATION OF THE ALKYD RESINS IN SURFACE COATING COMPOSITIONS

Each of the resins from Examples 1 to 3 was used to prepare a paint with a pigment : binder ratio of 0.8 : 1. The pigment was dispersed in the paint by means of a ball mill. The formulations were as follows:

MILLBASE

| | Parts by wt. | | |
|---|---|---|---|
| | 1 | 2 | 3 |
| Example 1 alkyd resin (20 wt.% in white spirit) | 26 | — | — |
| Example 2 alkyd resin (25 wt.% in white spirit) | — | 25 | — |
| Example 3 alkyd resin (20 wt.% in white spirit) | — | — | 28 |
| Titanium dioxide | 70 | 70 | 70 |

These compositions were ball-milled for 16 hours following which further quantities of resin in white spirit were added to stabilize the formulations and to prevent "pigment shock".

| | Parts by wt. | | |
|---|---|---|---|
| | 1 | 2 | 3 |
| Example 1 alkyd resin (70 wt.% in white spirit) | 12.5 | | |
| Example 2 alkyd resin 100 wt.% resin | | 7.75 | |
| Example 3 alkyd resin 100 wt.% resin | | | 8.4 |

The stabilized compositions were next made up to paint formulations for use by adding additional resin in white spirit to the stabilized millbase as follows:

| | Parts by wt. | | |
|---|---|---|---|
| | 1 | 2 | 3 |
| Stabilized Millbase | 108.5 | 102.75 | 106.4 |
| Example 1 : alkyd resin (70 wt.% in white spirit) | 105.0 | | |
| Example 2 : alkyd resin 100 wt.% resin | | 73.5 | |
| Example 3 : alkyd resin 100 wt.% resin | | | 73.5 |

The paint formulations were completed by the addition of suitable driers. To the composition derived from the Example 1, resin was added 0.025 wt.% cobalt naphthenate, 0.25 wt.% lead naphthenate and 0.25 wt.% calcium naphthenate and to the compositions derived from the Example 2 and 3 alkyd resins 0.05 wt.% cobalt naphthenate, 0.5 wt.% zirconium naphthenate and 0.25 wt.% calcium naphthenate (percentages calculated as metal based on the resin in the composition). The formulations were tested as follows:

DRYING TIME

This property was measured on a Beck-koller drying time recorder.

| Wet film thickness | 0.0015 inch | | | 0.003 inch | | |
|---|---|---|---|---|---|---|
| | Surface dry | Through dry | Hard dry | Surface dry | Through dry | Hard Dry |
| Formulation 1 | 1¾ hrs. | 2¾ hrs. | 10¾ hrs | 1¾ hrs. | 5¾ hrs. | 12¼ hrs. |
| Formulation 2 | 3¼ hrs. | 4¾ hrs. | 7¼ hrs | 3¼ | 4¾ hrs. | 15 hrs. |
| Formulation 3 | 1½ hrs. | 8½ hrs. | 13½ hrs | 1½ hrs. | 10 hrs. | — hrs. |

GLOSS

Measured by means of a Gardner 45° Gloss Head (Black tile standard = 80). Formulation 1 = 82, Formulation 2 = 82, Formulation 3 = 90.

HARDNESS

Measured on a Sward Rocker after 24 hours. Formulation 1 25%, Formulation 2 15.6%, Formulation 3 28.8% of standard.

FLEXIBILITY

Measured on a series of increasing diameter mandrels. The smallest mandrel about which a film from each formulation could be flexed was ⅛ inch.

ADHESION

Measured by the Cross-Hatch/Sellotape method. For the first and second formulations, the adhesion was 90% and for the third, 95%.

EXAMPLES 5 to 15

The procedure of Example 2 was used to prepare a number of alkyd resins of different oil length derived from soyabean, linseed and tung oils. The compositions of the alkyd resins obtained and details of their preparation are as follows:

| Example | Type of oil | Oil Length % | Wt. of IMPREZ 125C (g) | Wt. of oil (g) | Wt. of glycol (g) | Alcoholysis time (hr) | Esterification time (hr) | Acid Value |
|---|---|---|---|---|---|---|---|---|
| 5 | Soyabean | 45 | 275 | 225 | 13.8 | 1 | 6 | 8 |
| 6 | " | 50 | 250 | 250 | 12.6 | 1 | 5 | 8.25 |
| 7 | " | 55 | 225 | 275 | 11.3 | 1 | 6.5 | 8.75 |
| 8 | " | 70 | 150 | 350 | 7.6 | 1 | 4.75 | 7.7 |
| 9 | Linseed | 40 | 300 | 200 | 15 | 1 | 7 | 10.6 |
| 10 | " | 45 | 275 | 225 | 13.8 | 1 | 8 | 9.8 |
| 11 | " | 50 | 250 | 250 | 12.6 | 1 | 5.25 | 9.1 |
| 12 | " | 55 | 225 | 275 | 11.3 | 1 | 6.5 | 9.15 |
| 13 | " | 60 | 200 | 300 | 10.1 | 1 | 5.25 | 8.65 |
| 14 | " | 70 | 150 | 350 | 7.6 | 1 | 4.25 | 8.6 |
| 15 | Tung | 50 | 250 | 250 | 12.5 | 1 | Gel after 2 hr. | — |

The alkyds derived from soyabean oil and linseed oil were made up into white gloss paint formulations using as mill base 70 grams titanium dioxide and 30 grams of resin solution (20 wt.% resin in white spirit). The mill base was ball milled for approximately 16 hours and stabilized against pigment shock by adding enough resin to obtain a 5 : 1 ratio of pigment to resin. The final formulation was obtained by adding sufficient alkyd to obtain a pigment : binder ratio of 0.8 : 1 and driers. (0.05% cobalt, 0.5% zirconium, 0.25% calcium naphthenates for the soyabean alkyds, and 0.1% cobalt, 1% lead and 0.05% zirconium for the linseed oil alkyds). The driers were calculated as metal on solid alkyd resin and added to the paints. Each paint was allowed to age for three days before testing, then thinned to a known viscosity before application.

Drying time, flexibility, gloss and hardness of the paint films we measured as described in Example 4. The results were as follows:

| Drying Times (hrs.) | 0.0015 inch wet film | | | 0.003 inch wet film | | |
|---|---|---|---|---|---|---|
| Example | Surface dry | Through dry | Hard dry | Surface dry | Through dry | Hard dry |
| 5 | 1.5 | 6.25 | 8.75 | 1.5 | 4 | 12.75 |
| 6 | 6.25 | 10.5 | 15.25 | 6.5 | 11 | — |
| 7 | 4.5 | 9.25 | 17 | 7 | 9.5 | — |
| 8 | 12.5 | 16.75 | — | 13.5 | 17.75 | — |
| 10 | 0.75 | 2.75 | 9 | 1.25 | 6.5 | — |
| 11 | 1.5 | 7 | 9 | 4.5 | 8.5 | — |
| 12 | 6 | 8.5 | 21 | 6.25 | 18 | — |
| 13 | 5.75 | 8 | — | 6.5 | — | — |
| 14 | 7 | 14.75 | — | 8.5 | — | — |

| Example | Flexibility | Gloss | Hardness | | |
|---|---|---|---|---|---|
| | | | Initial | 1 month | 6 weeks |
| 5 | Pass 1/8 inch | 76 | — | 32.6% | 39.2% |
| 6 | " | 77 | — | 23.8% | 29.7% |
| 7 | " | 78 | — | 16.9% | 20.2% |
| 8 | " | 75 | — | 4.65% | 5.6% |
| 10 | Pass 5/16 inch | 56 | 3.5% | 12.6% | 26.8% |
| 11 | Pass 1/8 inch | 79 | 6.3% | 21.5% | 33.3% |
| 12 | " | 76 | 4.1% | 12.0% | 20.9% |
| 13 | " | 74 | 3.5% | 8.2% | 13.7% |
| 14 | " | 75 | 2.9% | 5.0% | 7.1% |

The linseed oil based resins dried faster than the corresponding oil length soyabean based resins as a result of the greater unsaturation present.

Drying times are in general longer the longer the oil length.

EXAMPLE 16

A mixture of linseed oil, (600 pts. by wt.), neopentyl glycol (33.9 pts. by wt.) and litharge (1.0 part by wt.) was placed in a flask and heated at 240°C for 1 hour under a short air condenser. The mixture was then cooled to 125°C and IMPREZ 125C (400 pts. by wt. added). The mixture was reheated to 225°C and held at this temperature until it had an acid value of less than 10 mgm. KOH/gram. (3¾ hrs.). The final acid value was 9.5 mgm. KOH/gram.

An ink based on this alkyd resin dried in 3 hrs.

EXAMPLE 17

A mixture of linseed oil (600 pts. by wt.), trimethylolpropane (41.7 pts. by wt.) and litharge (1.0 pt. by wt.) was heated at 240°C for 1 hr. as in Example 16 and then cooled to 125°C. IMPREZ 125C was next added (400 pts. by wt.) and the mixture reheated to 220°C and held at this temperature for 1 hr. while the acid value fell to less than 10 mgm. KOH/gram. The final product had an acid value of 9.4 mgm. KOH/gram and an ink based on the resin dried in 85 minutes.

EXAMPLE 18

A mixture of linseed oil (600 pts. by wt.), pentaerythritol (84 pts. by wt.) and litharge (1 pt. by wt.) was heated for 1 hr. at 245°C as in Example 16. The mixture was next cooled to 60°C and pentaerythritol (53.5 pts. by wt.), phthalic anhydride (260.2 pts. by wt.) and IMPREZ 125C (237.2 pts. by wt.) added. The mixture was reheated to 220°C and held at this temperature for 1.5 hrs. so as to obtain a viscosity of 6.6 poises at 125°C by cone and plate viscometer. The final resin had an acid value of 31.3 mgm. KOH/gram and was used in a printing ink formulation as a 50 wt.% solution in 260° – 290°C aliphatic petroleum distillate. The ink dried in 5 hrs.

EXAMPLES 19 TO 22

A mixture of linseed oil (556 grams), neopentyl glycol (66 grams) and litharge (0.3 gram) was heated at 260°C for 1 hour. The mixture was then cooled and IMPREZ 125C (750 grams) and a small quantity of xylene entrainer added and the mixture reheated to 225°C and held at this temperature until the acid value fell to less than 10 mgm KOH/gram.

To 100 grams of the alkyd prepared as above was added to 50 grams of one of four oils and the drying times of the compositions measured as 50 wt.% solutions in white spirit using three different drier systems. The results were as follows:

| Example | Oil | Drier system(a) | | | Drier system (b) | | | Drier system (c) | | |
|---|---|---|---|---|---|---|---|---|---|---|
| | | SD | TD | HD | SD | TD | HD | SD | TD | HD |
| 19 | Linseed | 2.0 | 2.5 | 4.25 | 1.75 | 2.75 | 3.75 | 2.5 | 3.0 | 4.75 |
| 20 | Soyabean | 2.25 | 4.5 | 6.75 | 2.75 | 3.75 | 5.0 | 2.0 | 4.0 | 5.0 |
| 21 | Tung | 1.0 | 1.75 | 2.25 | 0.75 | 1.0 | 1.75 | 0.5 | 3.0 | 6.75 |
| 22 | Oiticica | 1.25 | 2.0 | 2.5 | 0.75 | 1.25 | 1.75 | 0.75 | 1.5 | 2.25 |

Wet Film Thickness 0.0015 inch

Drier system(a) is 0.05 wt.% cobalt
Drier system(b) is 0.01 wt.% cobalt
Drier system(c) is 0.1 wt.% cobalt, 1.0 wt.% lead and 0.05 wt% zirconia.
SD = Surface dry
TD = Through dry
HD = Hard dry.

We claim:

1. In an alkyd resin which comprises the condensation product of a polybasic acid and a polyhydric alcohol, the improvement whereby part at least of the polybasic acid is the reaction product of an olefinically unsaturated hydrocarbon resin with an alpha, beta-olefinically unsaturated monobasic acid, dibasic acid, or derivative thereof selected from the group consisting of acrylic acid, methacrylic acid, maleic acid, maleic anhydride, fumaric acid, itaconic acid, citraconic acid, itaconic acid anhydride, citraconic acid anhydride, mesaconic acid and the lower alkyl esters of these acids.

2. The alkyd resin as claimed in claim 1 in which the condensation product also comprises a monobasic acid.

3. An alkyd resin as claimed in claim 1 in which the condensation product comprises an ester of a monobasic acid.

4. An alkyd resin as claimed in claim 1 in which the hydrocarbon resin is produced by the polymerization of a pyrolysis gasoline using a Friedel Crafts catalyst.

5. An alkyd resin as claimed in claim 4 in which $C_4$ alkenes or di-isobutene is added to the pyrolysis gasoline prior to the polymerisation to the resin.

6. An alkyd resin as claimed in claim 1 which contains in addition to the resin/unsaturated acid or derivative adduct an additional polybasic acid selected from the group consisting of ortho-, iso- and tere-phthalic acid, an aliphatic dibasic acid containing up to 20 carbon atoms, trimellitic acid and pyromellitic acid.

7. An alkyd resin as claimed in claim 1 which is derived from
   a. a polyhydric alcohol selected from the group consisting of mono-, di- and tri-ethylene glycol, mono-, di- and tri-propylene glycol, mono-, di- and tri-butylene glycol, polyethylene glycol, polypropylene glycol, polybutylene glycol, neopentyl glycol, glycerol, trimethylol propane, trimethylol ethane, pentaerythritol, dipentaerythritol and sorbitol,
   b. a monobasic acid or ester selected from the group consisting of tall oil acids, linseed oil, soyabean oil, soya oil, whale oil, dehydrated castor oil, tung oil, fish oil, safflower oil, oiticica oil, cotton seed oil, coconut oil, and aliphatic monobasic acids containing 6 to 22 carbon atoms, and
   c. the reaction product of an olefinically unsaturated hydrocarbon resin derived from pyrolysis gasoline with an alpha,beta-olefinically unsaturated monobasic acid, dibasic acid or derivative thereof selected from the group consisting of acrylic acid, methacrylic acid, maleic acid, maleic anhydride, fumaric acid, itaconic acid, citraconic acid, mesaconic acid and the lower alkyl esters of these acids.

8. An alkyd resin as claimed in claim 7 which also includes an additional polybasic acid selected from the group consisting of ortho-, iso- and terephthalic acid, an aliphatic dibasic acid containing up to 20 carbon atoms, trimellitic acid and pyromellitic acid.

9. A process for the preparation of an alkyd resin as claimed in claim 2 in which the monobasic acid or monobasic acid ester is first reacted with the polyhydric alcohol and the intermediate product so formed is then further reacted with the resin/unsaturated acid or derivative adduct (including any additional polybasic acid).

* * * * *